Nov. 14, 1933.  L. SUSSMAN  1,934,777
TUBE THREADING DIE STOCK
Filed Aug. 9, 1930  2 Sheets-Sheet 1
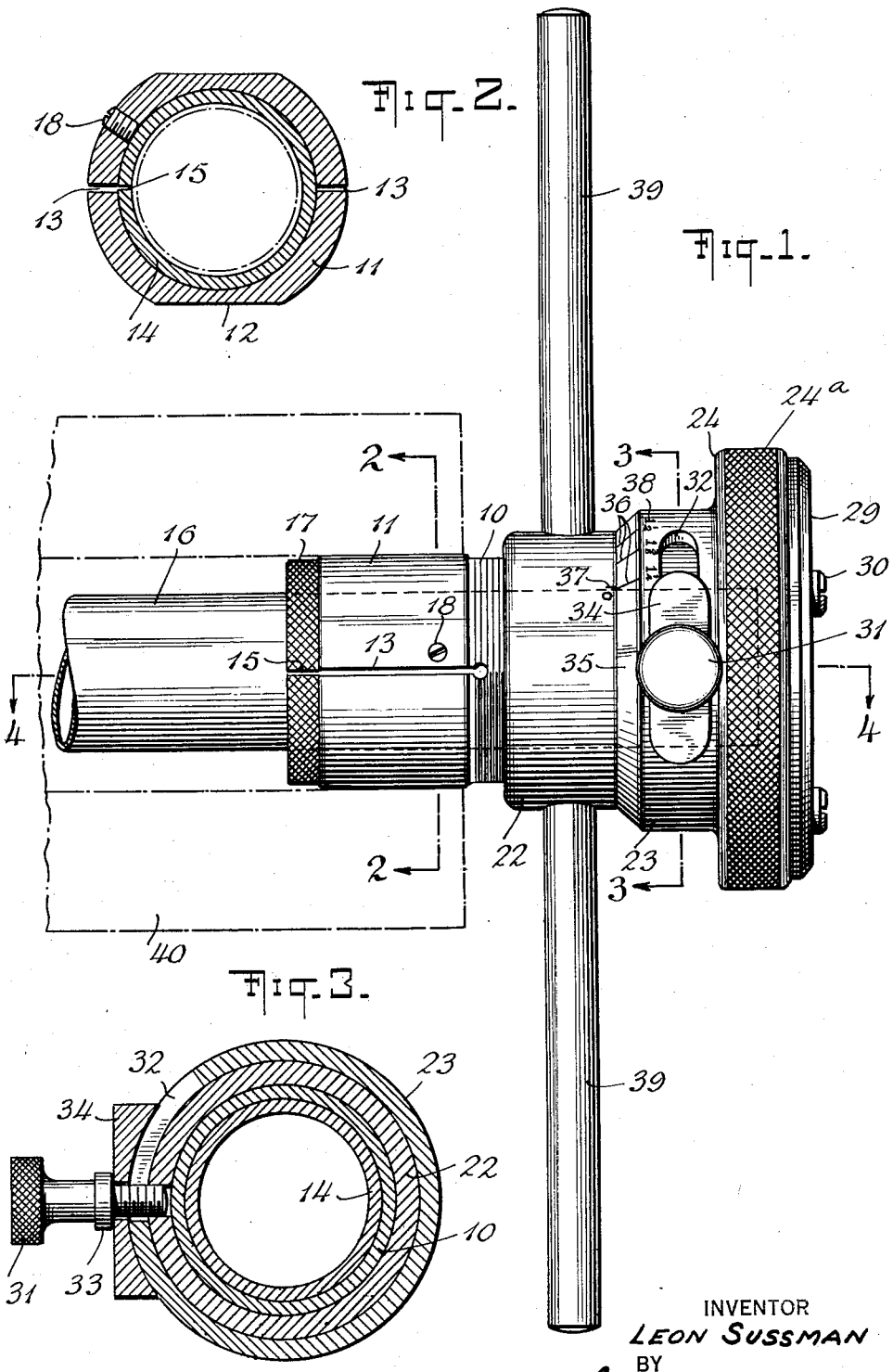
INVENTOR
*LEON SUSSMAN*
BY
*Soika d Kehlenbes*
ATTORNEYS

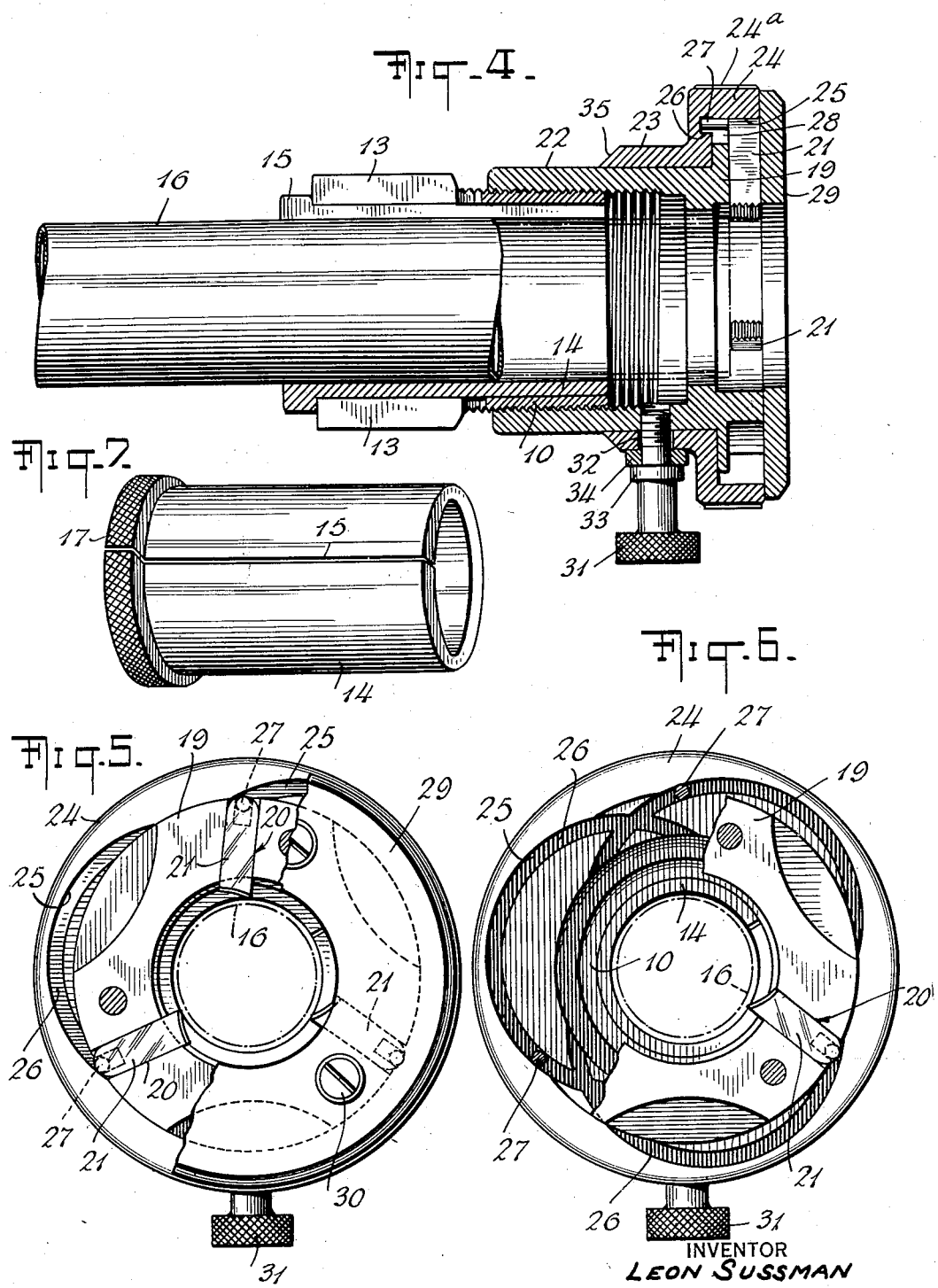

Patented Nov. 14, 1933

1,934,777

UNITED STATES PATENT OFFICE 1,934,777

TUBE THREADING DIE STOCK

Leon Sussman, Bayonne, N. J., assignor of one-half to Joseph F. Wilgus, Elizabeth, N. J.

Application August 9, 1930. Serial No. 474,119

3 Claims. (Cl. 10—123)

My invention relates to dies for cutting screw threads and has for its object to provide a die of novel construction adapted especially for cutting threads upon tubes made of very thin metal without subjecting the same to any strains tending to deform said tubes. Other more specific objects will appear from the description hereinafter and the features of novelty will be pointed out in the claims.

In the accompanying drawings, which illustrate an example of the invention without defining its limits, Fig. 1 is a plan view of the novel tube threading die; Fig. 2 is a cross-section on the line 2—2 of Fig. 1; Fig. 3 is a similar view on the line 3—3 of Fig. 1; Fig. 4 is a longitudinal section on the line 4—4 of Fig. 1; Fig. 5 is an end view with parts broken away; Fig. 6 is a similar view with parts broken away to show the internal construction, and Fig. 7 is a perspective view illustrating a sleeve which forms part of the device.

As shown in the illustrated example, the tube threading die comprises an externally threaded tubular member 10 terminating at one end in a split ring 11, the outer surface of which is flattened as indicated at 12 or otherwise formed to provide a non-circular external surface on said ring 11; the latter is split as indicated at 13 so as to provide a certain amount of inherent resiliency in said ring 11 for the purpose to be more fully described hereinafter. The inner diameter of the member 10 and ring 11 corresponds to the external diameter of the largest size of tubing for which the die is designed. To adapt the die to accommodate tubing of lesser diameter, one or more sleeves 14 may be provided, said sleeves being longitudinally split as indicated at 15 and having an axial length which preferably corresponds to the combined axial length of the member 10 and ring 11. The external diameter of the sleeve 14 is such that it will snugly fit within the co-axial bore of the member 10 and the ring 11, while the internal diameter thereof corresponds to the tube 16 which it is intended to accommodate. In order to facilitate the introduction of the sleeve 14 into the ring 11 and member 10, said sleeve is provided at one end with an annular flange 17, the outer surface of which is preferably knurled to facilitate manipulation of the sleeve 14; the flange 17 by engagement with the free end surface of the ring 11 also serves as a stop to properly position the sleeve 14 within the member 10 and ring 11; the split 15 preferably extends into the flange 17, as shown in Fig. 2.

In order to fix the sleeve in position in the member 10 and ring 11, a set screw 18 may be provided in the ring 11, as illustrated in Figs. 1 and 2. The device further comprises a cutting head 19, shaped for instance as indicated in Figs. 5 and 6, and provided with guideways 20 which preferably are arranged in tangential relation to the axis of the die, or, in other words are slightly off the direct diagonal, as illustrated in Figs. 5 and 6. Cutting jaws or chasers 21 are slidably mounted in the guideways 20 and have their outer ends preferably rounded for the purpose which will appear more fully hereinafter. An internally screwthreaded extension 22 projects in an axial direction from the cutting head 19 into threaded engagement with the tubular member 10 and is rotatable thereon to progressively travel lengthwise of said tubular member 10 in accordance with the progress of the thread cutting operation, as will be more clearly explained further on in the description.

In addition to the parts so far described, the thread cutting die includes a collar 23 rotatably mounted upon the extension 22 and including a section 24 of relatively larger diameter which projects over the cutting head 19, as shown in Fig. 4. The section 24 of the collar 23 is provided with internal cam surfaces 25 eccentric to the axis of the die and with correspondingly eccentric cam grooves 26, as shown in Figs. 5 and 6. The cutting jaws or chasers 21 have their outer curved ends in abutting engagement with the cam surfaces 25 and are provided with pins or equivalent projections 27 which extend through suitable openings 28 in the cutting head 19 into the cam grooves 26, as illustrated in Fig. 4. An end or cover plate 29 is secured to the cutting head 19 by means of screws 30 and projects outwardly over the peripheral end surface of the extension 22 for the purpose of maintaining the cutting jaws 21 in proper position in the guideways 20; as shown in Fig. 4, the cutting jaws 21 thus lie between the end surface of the cutting head 19 and the inner surface of the end plate 29. With this arrangement, as the collar 23 and its section 24 are rotated relatively to the extension 22, the jaws 21 will be moved inwardly by the action of the cam surfaces 25 upon the curved end thereof and outwardly in said guideways by the action of the cam grooves 26 upon the pins 27 or their equivalent. By having the outer ends of the jaws in abutting engagement with the cam surfaces 25, said jaws are firmly fixed against unintentional outward movement during the thread cutting operation.

To facilitate the rotation of the collar 23, the outer surface of the section 24 thereof may be knurled, as indicated at 24ᵃ. Any suitable means may be provided for locking the collar 23 and its section 24 against movement to fix the jaws 21 in a set position; for instance, a locking screw 31 may be provided for this purpose and extend through a slot 32 formed in the collar 23, as shown in Fig. 1 into screw-threaded engagement with an internally threaded aperture provided in the extension 22 to receive the same. The locking screw 31 is provided with an annular shoulder 33 adapted to bear against a clamping shoe 34, which is slidably fitted upon the collar 23 in registry with the slot 32 thereof, as indicated in Figs. 1 and 4. It will be obvious that as the screw 31 is screwed into the opening of the extension 22 the shoulder 33 will bear against the shoe 34 and thereby cause the latter to exert a clamping pressure on the collar 23, which prevents unintentional movement thereof from any adjusted position. For the purpose of indicating the size of tubing for which the jaws 21 are set, the collar 23 may have its free edge bevelled as indicated at 25 and provided with indicating marks 36 adapted to cooperate with an indicating mark 37 produced upon the extension 22. Figure designations 38 may be produced upon the collar 23 in juxtaposition to the indicating marks 36 to visibly designate the size of tubing to which said marks relate. Thus, in the illustrated example, the device is adapted to cut threads upon three different sizes of tubes having diameters respectively of one and one quarter, one and three eighths, and one and one half inches; it will be clear that the die may be designed to cut threads upon either a greater or lesser number of differently dimensioned tubes, without in any way affecting the operation or efficiency of the device. To facilitate the operation of the cutting jaws, the extension 22 may be provided with handles in the form of rods 39 projecting outwardly from said extension 22 in opposite diagonal directions, as illustrated in Fig. 2; these rods 39 are preferably detachably connected with the extension 22 to facilitate the assembling of the die.

In the illustrated example, the jaws 21 have been set to cut threads upon tubes 16, which have an external diameter of an inch and one quarter. A sleeve 14 of corresponding diameter has accordingly been inserted into the co-axial bore of the ring 11 and tubular member 10 and secured therein by the set screw 18, preferably with the slit 15 in registry with one of the slits 13 of the ring 11, as shown in Fig. 2. In practice the tubular member 10 is then rotated relatively to the extension 22 or the latter is rotated relatively to the tubular member 10 so as to cause the latter to project from said extension 22 to an extent corresponding to the amount of thread which is to be cut upon the tube; if the thread to be cut is of greater extent than the threaded length of the extension 10, the latter is simply unscrewed from the extension 22 as far as possible, and the threading operation is performed in successive steps by re-adjusting said tubular member 10 and the tube 16 until the desired amount of threading has been accomplished. After the tubular member 10 has been initially set in the manner set forth, the tube 16 to be threaded is inserted either directly into the co-axial bore of the ring 11 and member 10, or into the bore of the sleeve 14, as in the illustrated example, until the end of said tube 10 lies flush with the free end of the tubular member 10. The ring 11 is then placed within the jaws 39 of an ordinary vice or other clamping means with said jaws thereof in engagement with the flattened portions 12 of the ring 11. The vice jaws 39 or equivalent means is caused to exert a clamping action upon the ring 11, which firmly fixes the device in position and at the same time causes the ring 11 and the sleeve 14, if the latter is included in the operation, to develop a clamping action upon the tube 16, which is to be threaded. The splits 13 and 15 are so dimensioned and designed that the clamping forces developed upon the tube 16 while amply sufficient to hold said tube against rotation during the thread cutting operation are not strong enough to deform said tube 16 in any way. This is of extreme importance in the cutting of threads upon very thin tubing, such as waste pipes, which, because of their thinness, are easily deformed and accordingly are difficult to thread with ordinary thread cutting dies. After the device has been clamped in the vice 40 or its equivalent, the apparatus is ready for the thread cutting operation and the extension 22 with its associated elements is accordingly rotated by means of the handles or rods 40, or in any other convenient manner. As this operation takes place, the threaded engagement between the extension 22 and the tubular member 10 causes said extension 22 to progressively travel lengthwise of said tubular member 10, and at the same time, rotates the jaws 21 in thread cutting engagement with the tube 16 and causes them to progressively cut the thread upon said tube 16, as will be evident; in other words, in the operation of the die, the extension 22 travels lengthwise of the tubular member 10 in exact accordance with the progress of the thread cutting operation, it being understood that the pitch of the threads of the tubular member 10 and extension 22 corresponds to the pitch of the thread being cut by the jaws 21. When the extension 22 reaches the ring 11 so that further progress upon the tubular member 10 is impossible, the device may be re-set for further threading by simply causing the extension 22 and its associated elements to travel in a reverse direction upon the tubular member 10 and to then advance the tube 16 a sufficient distance to bring the terminus of the initially threaded section into registry with the cutting jaws 21, whereupon the previously described operations may be repeated. This re-adjustment of the parts may be repeated as often as may be necessary to produce the desired amount of thread upon the tube 16. If the amount of thread to be cut upon the tube 16 is less than the axial length of the tubular member 10, the extent to which this member 10 is exposed relatively to the extension 22 will clearly indicate the exact amount of thread which will be cut upon the tube 16 by the time the extension 22 reaches the ring 11. The tubular member 10 and the ring 11, either alone or in co-operation with the sleeve 14, serve to steady the tube 16 and to hold it absolutely in a true position during the threading operation, so that the cutting of the thread is very accurate and consequently permits the cutting of very fine threads of absolute uniformity and accuracy upon even the thinnest of tubing.

The device is extremely simple in construction and at the same time is of maximum efficiency in operation and provides a threading die which may be efficiently utilized for cutting threads upon tubing of any gauge and especially adapted for the cutting of threads upon very thin tubing, which is easily deformable.

Various changes in the specific forms shown and described may be made within the scope of the claims without departing from the spirit of the invention.

I claim:

1. In a tube threading die including an externally threaded tubular member adapted to receive the tube to be threaded, a flattened split ring constituting an axial extension of said tubular member beyond the operative range of the die and adapted to be secured in a vise to fix said tube in position for threading and to protect the same against deforming stresses developed by said vise, the combination of a cutting head provided with guideways tangential to the axis of the die, an internally threaded extension projecting from said head in threaded engagement with said tubular member and rotatable thereon to progressively travel lengthwise of said tubular member in accordance with the progress of the thread cutting operation, a collar rotatably mounted upon said extension and projecting over said cutting head and provided with internal cam surfaces and corresponding cam grooves, cutting jaws mounted in the guideways of said head in engagement with said cam surfaces, pins carried by said jaws and extending into said cam grooves, said collar rotatably shifting said cam surfaces and cam grooves to adjust said jaws to different cutting positions, and radially extending means for locking said collar against movement whereby said jaws are fixed in the set position.

2. A tube threading die comprising an externally threaded tubular member adapted to receive the tube to be threaded, a flattened split ring constituting an axial extension of said tubular member beyond the operative range of the die and adapted to be secured in a vise to fix said tube in position for threading and to protect the same against deforming stresses developed by said vise, a cutting head provided with guideways tangential to the axis of the die, an internally threaded extension projecting from said head in threaded engagement with said tubular member and rotatable thereon to progressively travel lengthwise of said tubular member in accordance with the progress of the thread cutting operation, cutting jaws mounted in the guideways of said head, and means for setting said jaws in different cutting positions dependent upon the diameter of the tube to be threaded.

3. A tube threading die comprising an externally threaded tubular member adapted to receive the tube to be threaded, a flattened split ring constituting an axial extension of said tubular member beyond the operative range of the die and adapted to be secured in a vise to fix said tube in position for threading and to protect the same against deforming stresses developed by said vise, and thread cutting means in threaded engagement with said tubular member and rotatable thereon to progressively travel lengthwise of said member in accordance with the progress of the thread cutting operation.

LEON SUSSMAN.